US011113876B2

(12) United States Patent
Peuhkurinen (10) Patent No.: US 11,113,876 B2
(45) Date of Patent: Sep. 7, 2021

(54) METHOD FOR DISPLAYING A 3D SCENE GRAPH ON A SCREEN

(71) Applicant: Huawei Technologies Co., Ltd., Shenzhen (CN)

(72) Inventor: Antti Erik Peuhkurinen, Tampere (FI)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 581 days.

(21) Appl. No.: 14/143,110

(22) Filed: Dec. 30, 2013

(65) Prior Publication Data
US 2014/0313197 A1   Oct. 23, 2014

Related U.S. Application Data

(63) Continuation of application No. PCT/CN2013/084439, filed on Sep. 27, 2013.

(30) Foreign Application Priority Data

Apr. 19, 2013 (EP) .................................... 13164409

(51) Int. Cl.
| | | |
|---|---|---|
| *G06T 17/05* | (2011.01) | |
| *G06T 17/00* | (2006.01) | |
| *G06F 9/451* | (2018.01) | |

(52) U.S. Cl.
CPC .............. *G06T 17/05* (2013.01); *G06F 9/451* (2018.02); *G06T 17/00* (2013.01); *G06T 2210/61* (2013.01)

(58) Field of Classification Search
CPC ....... G06T 15/00; G06T 15/005; G06T 15/04; G06T 15/06; G06T 15/10; G06T 15/50;
(Continued)

(56) References Cited

U.S. PATENT DOCUMENTS

| 5,764,241 A | 6/1998 | Elliott et al. |
|---|---|---|
| 6,552,721 B1 | 4/2003 | Ishikawa |
| (Continued) | | |

FOREIGN PATENT DOCUMENTS

| CN | 101563712 A | 10/2009 |
|---|---|---|
| CN | 101578629 A | 11/2009 |
| (Continued) | | |

OTHER PUBLICATIONS

Foreign Communication From A Counterpart Application, Korean Application No. 10-2013-7033996, Korean Office Action dated Dec. 16, 2014, 5 pages.

(Continued)

*Primary Examiner* — Sae Won Yoon
(74) *Attorney, Agent, or Firm* — Conley Rose, P.C.

(57) ABSTRACT

The invention relates to a method for displaying a three-dimensional (3D) scene graph on a screen, the method comprising: attaching 3D resources to a set of application scene nodes; separating a first process running in a first application context on an operating system of a computer system from a second process running in a second application context on the operating system by connecting a first sub-set of the application scene nodes to the first process and connecting a second sub-set of the application scene nodes to the second process; loading the first process and the second process to a 3D display server of the computer system; constructing the 3D scene graph based on the first process and the second process; and displaying the 3D scene graph on the screen.

18 Claims, 6 Drawing Sheets

(58) Field of Classification Search
CPC ....... G06T 15/506; G06T 15/60; G06T 15/80; G06T 17/00; G06T 17/005; G06T 17/10; G06T 17/20; G06T 17/205; G06T 19/00; G06T 19/003; G06T 19/20
USPC .............................. 345/419, 420, 426, 582
See application file for complete search history.

(56) References Cited

U.S. PATENT DOCUMENTS

| | | | |
|---|---|---|---|
| 6,608,640 B1 | 8/2003 | Nagahara et al. | |
| 6,684,255 B1 | 1/2004 | Martin et al. | |
| 6,741,242 B1* | 5/2004 | Itoh et al. | 345/419 |
| 7,290,216 B1* | 10/2007 | Kawahara et al. | 715/762 |
| 7,703,045 B1* | 4/2010 | Kawahara et al. | 715/853 |
| 8,035,636 B1* | 10/2011 | Yang | G06T 15/00 345/418 |
| 8,441,496 B1* | 5/2013 | Maguire | 345/581 |
| 2002/0163515 A1* | 11/2002 | Sowizral et al. | 345/419 |
| 2003/0025692 A1* | 2/2003 | Lu | G01V 1/32 345/418 |
| 2003/0117394 A1 | 6/2003 | Muraki et al. | |
| 2003/0172366 A1* | 9/2003 | Rhee et al. | 717/100 |
| 2004/0172448 A1 | 9/2004 | Kobayashi et al. | |
| 2004/0196299 A1* | 10/2004 | Di Lelle et al. | 345/619 |
| 2005/0110790 A1* | 5/2005 | D'Amora | 345/419 |
| 2005/0179691 A1* | 8/2005 | Johnson | G06T 1/60 345/552 |
| 2005/0179703 A1* | 8/2005 | Johnson | G06F 9/4445 345/632 |
| 2005/0182844 A1 | 8/2005 | Johnson et al. | |
| 2006/0061570 A1 | 3/2006 | Cheryauka et al. | |
| 2008/0150949 A1 | 6/2008 | Wei et al. | |
| 2008/0165199 A1 | 7/2008 | Wei et al. | |
| 2008/0278482 A1* | 11/2008 | Farmanbar et al. | 345/419 |
| 2009/0315902 A1 | 12/2009 | Beda et al. | |
| 2010/0289804 A1* | 11/2010 | Jackman | G06F 9/547 345/520 |
| 2011/0178854 A1* | 7/2011 | Sofer | G06Q 30/0241 705/14.4 |
| 2011/0205229 A1* | 8/2011 | Jagadev | G06F 17/30241 345/428 |
| 2012/0089374 A1* | 4/2012 | Kripac | G06T 17/30 703/1 |
| 2013/0076734 A1* | 3/2013 | Rolleston | G06T 19/00 345/419 |
| 2013/0097521 A1* | 4/2013 | Lewin | G06F 9/4443 715/744 |
| 2013/0159893 A1* | 6/2013 | Lewin | G06F 9/4443 715/762 |
| 2013/0219303 A1* | 8/2013 | Eriksson | G06F 3/1454 715/759 |
| 2014/0168218 A1* | 6/2014 | Mitrea | H04N 21/23412 345/420 |
| 2014/0258968 A1* | 9/2014 | Brown | G06F 17/21 717/103 |
| 2014/0362086 A1* | 12/2014 | Brockmann | H04N 19/56 345/440 |
| 2015/0170396 A1* | 6/2015 | Kornmann | G06T 15/005 345/419 |

FOREIGN PATENT DOCUMENTS

| | | |
|---|---|---|
| CN | 102169598 A | 8/2011 |
| CN | 102736947 A | 10/2012 |
| JP | 2000515659 A | 11/2000 |
| JP | 2003228721 A | 8/2003 |
| JP | 2004265081 A | 9/2004 |
| WO | 9854636 A2 | 12/1998 |

OTHER PUBLICATIONS

Foreign Communication From A Counterpart Application, Korean Application No. 10-2013-7033996, English Translation of Korean Office Action dated Dec. 16, 2014, 3 pages.
Peuhkurinen, A., et al., "Using RDF Data as Basis for 3D Window Management in Mobile Devices," Elsevier, Procedia Computer Science, vol. 5, XP028266195, Sep. 2011, pp. 645-652.
Foreign Communication From A Counterpart Application, PCT Application No. PCT/CN20131084439, International Search Report dated Jan. 23, 2014, 6 pages.
Foreign Communication From A Counterpart Application, PCT Application No. PCT/CN20131084439, Written Opinion dated Jan. 23, 2014, 4 pages.
Foreign Communication From A Counterpart Application, European Application No. 13164409.8, Extended European Search Report dated Oct. 21, 2013, 7 pages.
Partial English Translation and Abstract of Japanese Patent Application No. JP2000515659A, Aug. 6, 2015, 25 pages.
Partial English Translation and Abstract of Japanese Patent Application No. JP2004265081A, Aug. 6, 2015, 47 pages.
Matsumoto, M., "Scene graph for accelerating 3D graphics," TransTECH, Shoeisha, vol. 8, No. 6, Jul. 1, 1999, pp. 56-65.
English Translation of "Matsumoto, M., "Scene graph for accelerating 3D graphics," TransTECH, Shoeisha, vol. 8, No. 6, Jul. 1, 1999, pp. 56-65." 6 pages.
Foreign Communication From A Counterpart Application, Japanese Application No. 2015-511931, Japanese Office Action dated Jun. 30, 2015, 4 pages.
Foreign Communication From A Counterpart Application, Japanese Application No. 2015-511931, English Translation of Japanese Office Action dated Jun. 30, 2015, 5 pages.
Foreign Communication From A Counterpart Application, Japanese Application No. 2016-121763, Japanese Office Action dated May 23, 2017, 3 pages.
Foreign Communication From A Counterpart Application, Japanese Application No. 2016-121763, English Translation of Japanese Office Action dated May 23, 2017, 3 pages.
Machine Translation and Abstract of Chinese Publication No. CN102169598, Aug. 31, 2011, 13 pages.
Machine Translation and Abstract of Chinese Publication No. CN102736947, Oct. 17, 2012, 8 pages.
Foreign Communication From A Counterpart Application, Chinese Application No. 201380077556.4, Chinese Search Report dated Dec. 13, 2017, 2 pages.
Foreign Communication From A Counterpart Application, Chinese Application No. 201380077556.4, Chinese Office Action dated Dec. 21, 2017, 6 pages.

* cited by examiner

METHOD FOR DISPLAYING A 3D SCENE GRAPH ON A SCREEN

CROSS-REFERENCE TO RELATED APPLICATIONS

This application is a continuation of International Application No. PCT/CN2013/084439, filed on Sep. 27, 2013, which claims priority to EP Patent Application No. EP13164409.8, filed on Apr. 19, 2013, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to a method for displaying a three-dimensional (3D) scene graph on a screen and to an operating system for a 3D computer system, in particular to a graphic stack in such an operating system, especially in the area of window management and process separation interface for application visualizations.

BACKGROUND

The desktop metaphor was originally introduced by Alan Kay at Xerox PARC in 1970. The stacking desktop metaphor was first used by Xerox Star allowing windows to stack. The Xerox Star allowed overlapping for dialogue boxes. Two components forming the desktop environment are usually the window manager and the widget toolkit providing unified look and feel for the applications and also to the desktop environment. Window management makes it possible to show multiple process visualizations at the same time to the end user. In current window managers, the interface between the window manager and the application processes is usually a rectangle bitmap. The data transfer is done in various ways between the application process and the window manager (e.g., by transferring the whole bitmap per frame drawn, transferring changed areas from the application bitmap or transferring single draw commands). A process separation increases the operating system level stability and robustness. Processes are totally isolated from each other by well-defined interfaces. As default, no process can access resources owned by other processes.

Some window managers embed process separated two-dimensional (2D) application surfaces to a 3D scene. 2D application surfaces can be placed to various places in these desktop environments; i.e. sides of a 3D cube, on a wall in a virtual world, etc. A summary of research work on this area made during the past years can be found in the document "Peuhkurinen A., Mikkonen T., Terho M.: Using RDF Data as Basis for 3D Window Manager in Mobile Devices, MobiWIS-2011, Niagara Falls, Canada, September 2011".

In order to create a 3D desktop environment where application processes can visualize themselves by directly using 3D objects to the same scene graph instead of using 2D surfaces, the prior art window managers and widget toolkits have to be re-designed. Hence, it is desirable to define a new visualization interface between the display server; i.e. the window manager and the applications processes.

In addition, the display server has to be able to render the process separated and graphics related data in a fast manner in order to display the applications directly by using 3D objects. Hence, it is desirable to find an optimal solution for handling and communicating the changes in the data as well as for loading and unloading the data between the display server and the application processes.

SUMMARY

It is the object of the invention to provide an improved visualization interface between a display server and applications in a 3D video system.

This object is achieved by the features of the independent claims. Further implementation forms are apparent from the dependent claims, the description and the figures.

The invention is based on the finding that an improved visualization interface between a display server and applications in a 3D video system can be created by applying new components to the graphic stack which enable the display server with 3D scene graph to perform the process separation for the applications. Furthermore, the new components implement a 3D application interface instead of the commonly used 2D surface based application interface in the display servers. Thus, process separated application visualizations can be realized by 3D instead of the commonly used 2D surface.

In order to describe the invention in detail, the following terms, abbreviations and notations will be used:

3D: three-dimensional.

2D: two-dimensional.

3D computer graphics: 3D computer graphics are graphics that use a three-dimensional representation of geometric data that is stored in the computer for the purposes of performing calculations and rendering images. Such images may be stored for viewing later or displayed in real-time.

3D rendering: the 3D computer graphics process of automatically converting 3D wire frame models; i.e. the visual presentation of a three dimensional or physical object into 2D images with 3D photorealistic effects or non-photorealistic rendering on a computer.

3D computer Graphics Software: refers to programs used to create 3D computer-generated imagery. 3D modeling allows users to create and alter models via their 3D mesh. Users can add, subtract, stretch and otherwise change the mesh to their desire. Models can be viewed from a variety of angles, usually simultaneously. Models can be rotated and the view can be zoomed in and out.

UI: user interface. The user interface is the space where interaction between humans and machines occurs. The goal of this interaction is effective operation and control of the machine on the user's end, and feedback from the machine, which aids the operator in making operational decisions.

EGL: EGL is an interface between Khronos rendering APIs (such as OpenGL ES or OpenVG) and the underlying native platform windowing system. EGL handles graphics context management, surface/buffer binding, rendering synchronization, and enables high-performance, accelerated, mixed-mode 2D and 3D rendering using other Khronos APIs. Khronos is an industry consortium creating open standards for the authoring and acceleration of parallel computing, graphics, dynamic media, computer vision and sensor processing on a wide variety of platforms and devices.

GLES: (Open) GL for Embedded Systems (OpenGL ES) is a subset of the OpenGL 3D graphics application programming interface (API) designed for embedded systems such as mobile phones, personal digital assistants (PDAs), and video game consoles, API: application programming interface. An application programming interface is a protocol intended to be used as an interface by software components to communicate with each other. An API is a library that may include specification for routines, data structures, object classes, and variables.

Kernel: In computing, the kernel is the main component of most computer operating systems; it is a bridge between applications and the actual data processing done at the hardware level. The kernel's responsibilities include managing the system's resources (the communication between hardware and software components). Usually, as a basic component of an operating system, a kernel can provide the lowest-level abstraction layer for the resources (especially processors and input/output (I/O) devices) that application software must control to perform its function. It typically makes these facilities available to application processes through inter-process communication mechanisms and system calls.

Applications: software applications or application software is computer software designed to help the user to perform specific tasks, may be designed for embedded systems such as mobile phones, PDAs, and video game consoles.

Middleware: computer software that provides services to software applications, middleware may run on mobile phones, PDAs, and video game consoles.

Operating System Kernel: computer software designed to operate and control the computer hardware and to provide a platform for running application software; the operating system may be designed for being implemented on embedded systems such as mobile phones, PDAs, and video game consoles.

Process: an instance of a computer program that is being executed, the process may run on embedded systems such as mobile phones, PDAs, and video game consoles.

Window Manager: A window manager is system software that controls the placement and appearance of windows within a windowing system in a graphical user interface. Most window managers are designed to help provide a desktop environment. They work in conjunction with the underlying graphical system that provides required functionality—support for graphics hardware, pointing devices, and a keyboard, and are often written and created using a widget toolkit. Window managers are used to combine visualizations from different processes together and to control input flow. Thus, the window manager enables the user to experience all the visualizations and processes as a single system.

Display Server: The display server is also called window manager. As applications render graphics to their own buffers, the window manager becomes the display server, compositing those buffers to form the on-screen display of application windows. The display server is responsible for communicating with applications and video hardware and for prompting them to communicate with input hardware using other libraries.

3D widget toolkit: The 3D widget toolkit is used for creating a user interface. User interface toolkits are designed by creating a library of software objects and customizing them through instantiation and specialization within standard programming languages. 3D widgets are manipulated to model the construction of widgets and application objects whose geometric components are affinely constrained. Primitive 3D widgets can be combined with other primitive 3D widgets, using a process called linking, to establish one or more constraint relations between them.

According to a first aspect, the invention relates to a method for displaying a 3D scene graph on a screen, the method comprising: attaching 3D resources to a set of application scene nodes; separating a first process running in a first application context on an operating system of a computer system from a second process running in a second application context on the operating system by connecting a first sub-set of the application scene nodes to the first process and connecting a second sub-set of the application scene nodes to the second process; loading the first process and the second process to a 3D display server of the computer system; constructing the 3D scene graph based on the first process and the second process; and displaying the 3D scene graph on the screen.

The method allows running of 3D object based application visualization in the same scene while having the process separation; i.e. separating the first process running in the first application context from the second process running in the second application context. In this way, the security and the stability can be improved in the whole system. The 3D process separation enables embedding of some natural looking 3rd party applications into 3D applications to be constructed, such as augmented reality applications, in a secure and stabile way.

In a first possible implementation form of the method according to the first aspect of the invention, the 3D resources represent elementary 3D objects, in particular textures, shades and meshes.

A complex scene graph can thus be resolved in elementary objects so as to allow flexibility for implementing the scene graph.

In a second possible implementation form of the method according to the first aspect as such or according to the first implementation form of the first aspect, the method step of loading the first process and the second process further comprises separately loading the first process and the second process by using a process separation interface.

The process separation interface allows isolation of different processes and thus increases stability and robustness of the method with respect to conventional methods not using the process separation.

In a third possible implementation form of the method based on the second implementation form of the first aspect, the method comprises separately processing the first process and the second process in order to avoid conflicting accesses of the first process and the second process to a same application scene node.

By avoiding conflicting accesses of the first process and the second process to the same application scene node, the overall system stability is improved.

In a fourth possible implementation form of the method based on the second or based on the third implementation form of the first aspect, the method comprises controlling sharing of application scene nodes by the first process and the second process.

By managing sharing of application scene nodes by the first process and the second process in a controlled way, no process can access resources owned by other resources. Processes do not jeopardize the stability of the entire system.

3D UI elements enable the possibility to treat each one of the application UI elements in the scene separately, without loss of the process separation. 3D objects as UI elements enable usage of natural looking physics for the elements.

In a fifth possible implementation form of the method according to any of the second to the fourth implementation forms of the first aspect, the method comprises loading the first process running in a 3D application context and loading the second process running in a 2D application context to the 3D display server.

By loading processes running in different application contexts to the 3D display server, different processes can be displayed by a common 3D display server.

In a sixth possible implementation form of the method according to any of the second to the fifth implementation forms of the first aspect, the method comprises connecting the 3D display server to multiple application connections at the same time.

In a seventh possible implementation form of the method according to the first aspect as such or according to any of the preceding implementation forms of the first aspect, the method comprises loading processes to the 3D display server for which processes connections have been changed without loading processes to the 3D display server for which processes connections have not been changed.

By only loading processes having changed to the 3D display server, the speed of display can be increased and the computational complexity of the method is reduced as non-changed process connections do not have to be processed.

In an eighth possible implementation form of the method according to the first aspect as such or according to any of the preceding implementation forms of the first aspect, the connecting the first sub-set of application scene nodes to the first process and the connecting the second sub-set of application scene nodes to the second process comprises connecting further application scene nodes as child nodes to elements of the first sub-set or the second sub-set of the application scene nodes, the elements representing parent nodes.

By connecting child nodes to parent nodes, the method allows flexible connecting new nodes to the graph without affecting connections to existing nodes, thereby improving stability and flexibility.

In a ninth possible implementation form of the method according to the eighth implementation form of the first aspect, the further application scene nodes comprise location and rotation difference information with respect to their parent nodes.

The further application scene nodes can be defined by their relation to existing nodes. Only the difference information has to be processed and not the information of the complete graph.

In a tenth possible implementation form of the method according to the ninth implementation form of the first aspect, the location and rotation difference information comprises a matrix; in particular a 4×4 matrix.

By using matrices, elementary matrix operations can be applied for processing new nodes.

In an eleventh possible implementation form of the method according to the first aspect as such or according to any of the preceding implementation forms of the first aspect, the constructing the 3D scene graph comprises computing reflections, refractions, shadowing, shading and/or overlapping of the 3D resources with respect to each other.

The 3D applications can easily have reflections and refractions from each other because they are rendered in the same 3D scene. The 3D applications can have realistic looking shadows and shading because applications are rendered in the same 3D scene and can share the light sources. The impression of viewing the 3D scene graph is thus improved.

In a twelfth possible implementation form of the method according to the first aspect as such or according to any of the preceding implementation forms of the first aspect, the 3D display server is arranged inside an application process.

In a thirteenth possible implementation form of the method according to any of the second to the eleventh implementation forms of the first aspect, the 3D display server is arranged inside a third application process and further application processes are connected to the 3D display server over the process separation interface.

In a fourteenth possible implementation form of the method according to the thirteenth implementation form of the first aspect, the method comprises forming a tree structure where a node chain from root to leaf in the overall 3D scene graph comprises a plurality of process separation interfaces.

According to a second aspect, the invention relates to an operating system for a 3D computer system, the operating system comprising: application software configured for attaching 3D resources to a set of application scene nodes and configured for separating a first process running in a first application context of the application software from a second process running in a second application context of the application software by connecting a first sub-set of the application scene nodes to the first process and connecting a second sub-set of the application scene nodes to the second process; a 3D display server configured for constructing a 3D scene graph based on the 3D resources of the application scene nodes and for displaying the 3D scene graph on a screen; and a process separation interface between the application software and the 3D display server, the process separation interface being configured for separately loading the first process and the second process to the 3D display server.

By attaching 3D resources to application scene nodes, the 3D applications can overlap each other in new ways compared to 2D surfaces, like be tied around each other, while still looking totally natural and having the process separation; i.e. separating the first process running in the first application context from the second process running in the second application context, bringing the stability and the security.

In a first possible implementation form of the operating system according to the second aspect, the process separation interface is configured to connect different applications to the 3D display server, in particular 3D applications and 2D applications.

The 3D process separation enables embedding of natural looking 3rd party applications to 3D applications, like to augmented reality applications, in a secure and stabile way. 3rd party applications to 2D applications can be embedded as well. The operating system is interoperable to existing 2D applications and new 3D applications.

In a second possible implementation form of the operating system according to the second aspect as such or according to the first implementation form of the second aspect, the operating system comprises a 3D widget toolkit software providing user interface components for 3D application creation and providing the 3D resources to the application software and a platform graphics interface between the 3D display server and a kernel of the operating system configured for controlling computer hardware on which the operating system is running.

3D applications can be made with a ready-made widget toolkit which has common user interface elements, like buttons, text boxes, menus, layouts, etc., having 3D assets or by making custom UI elements and providing graphical assets, like textures, and meshes for them.

In a third possible implementation form of the operating system according to the second aspect as such or according to any of the preceding implementation forms of the second aspect, the 3D display server is arranged inside an application process.

An application process denotes a process running in an application context of the application software.

In a fourth possible implementation form of the method according to the second aspect as such or according to any of the preceding implementation forms of the second aspect, the 3D display server is arranged inside a third application process and further application processes are connected to the 3D display server over the process separation interface.

In a fifth possible implementation form of the operating system according to the fourth implementation form of the second aspect, the 3D display server is configured for forming a tree structure where a node chain from root to leaf in the overall 3D scene graph comprises a plurality of process separation interfaces.

According to a third aspect, the invention relates to a method and structure to obtain process separation in a single 3D scene graph.

According to a fourth aspect, the invention relates to a method and structure to offer a 3D application interface for a display server. The display server is also known as window manager.

According to a fifth aspect, the invention relates to a method and structure for creating process separated 3D application visualizations in a same 3D scene.

According to a sixth aspect, the invention relates to a method and structure for enabling transfer and communication of scene graph changes and 3D resources between a display server and application processes.

The methods, systems and devices described herein may be implemented as software in a Digital Signal Processor (DSP), in a micro-controller or in any other side-processor or as hardware circuit within an application specific integrated circuit (ASIC).

The invention can be implemented in digital electronic circuitry, or in computer hardware, firmware, software, or in combinations thereof; e.g. in available hardware of conventional mobile devices or in new hardware dedicated for processing the methods described herein.

BRIEF DESCRIPTION OF THE DRAWINGS

Further embodiments of the invention will be described with respect to the following figures, in which.

DETAILED DESCRIPTION

Figure 1:
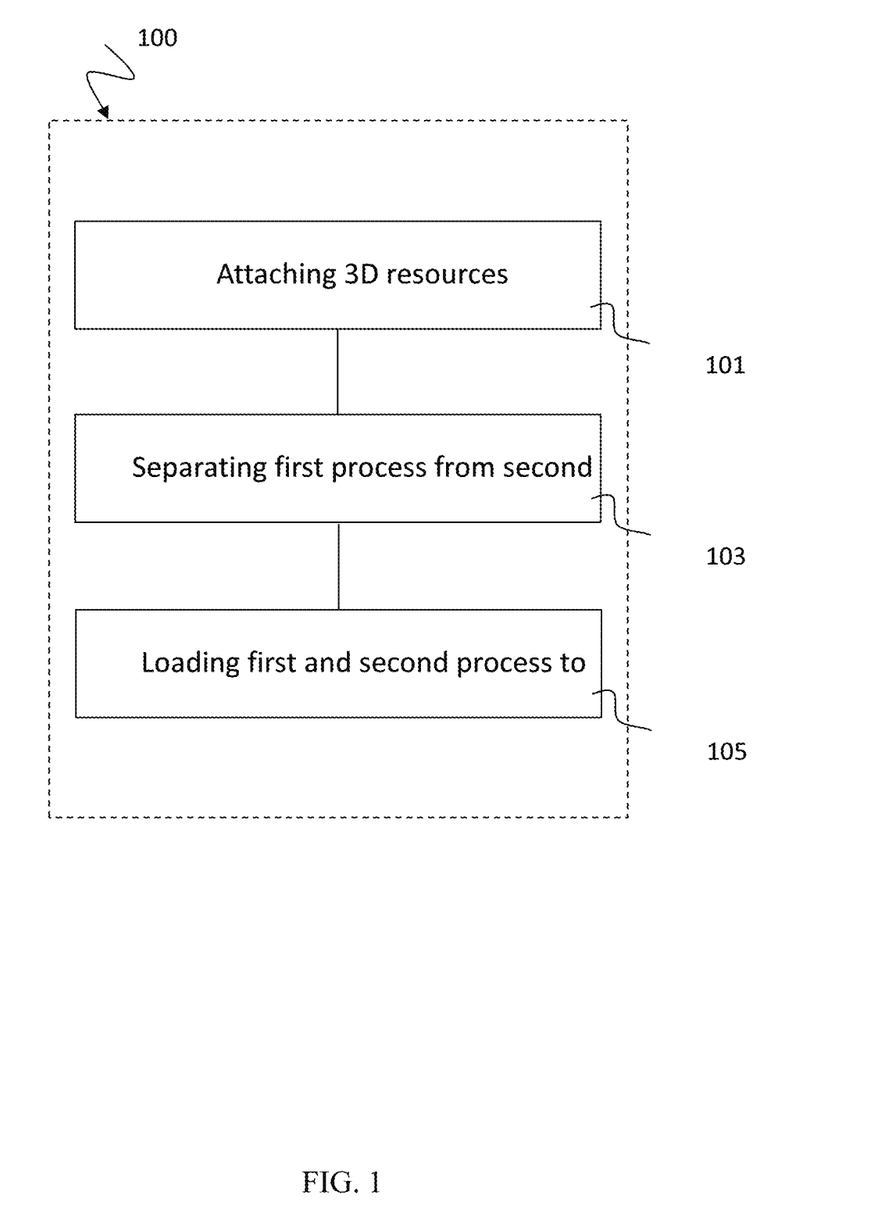
FIG. 1 shows a schematic diagram illustrating a method 100 for displaying a 3D scene graph on a screen according to an implementation form.

FIG. 1 shows a schematic diagram illustrating a method 100 for displaying a 3D scene graph on a screen according to an implementation form.

The method 100 comprises attaching 101 3D resources to a set of application scene nodes.

The method 100 comprises separating 103 a first process running in a first application context on an operating system of a computer system from a second process running in a second application context on the operating system by connecting a first sub-set of the application scene nodes to the first process and connecting a second sub-set of the application scene nodes to the second process. The method 100 comprises loading 105 the first process and the second process to a 3D display server of the computer system, the 3D display server being configured for constructing the 3D scene graph based on the 3D resources of the application scene nodes and displaying the 3D scene graph on the screen.

In an implementation form of the method 100, the 3D resources represent elementary 3D objects, in particular textures, shades and meshes. In this way, a complex scene graph can be resolved in elementary objects so as to allow flexibility for implementing the scene graph.

In an implementation form of the method 100, the loading the first process and the second process comprises separately loading the first process and the second process by using a process separation interface. In an implementation form of the method 100, the process separation interface is configured to avoid conflicting accesses of the first process and the second process to a same application scene node. In an implementation form of the method 100, the process separation interface is configured to manage sharing of application scene nodes by the first process and the second process in a controlled way.

The process separation interface allows isolation of different processes and thus increases stability and robustness of the method with respect to conventional methods not using the process separation. By avoiding conflicting accesses of the first process and the second process to the same application scene node, the overall system stability is improved. By managing sharing of application scene nodes by the first process and the second process in a controlled way, no process can access resources owned by other resources. Processes do not jeopardize the stability of the entire system. 3D UI elements enable possibility to treat each one of application UI element in the scene separately, without loss of the process separation. 3D objects as UI elements enable usage of natural looking physics for the elements.

In an implementation form of the method 100, the process separation interface is configured to load processes running in different application contexts to the 3D display server. In an implementation form of the method 100, the process separation interface is configured to connect the 3D display server to multiple application connections at the same time. In an implementation form, the method 100 comprises loading processes to the 3D display server for which processes connections have been changed without loading processes to the 3D display server for which processes connections have not been changed. In an implementation form of the method 100, the connecting the first sub-set of application scene nodes to the first process and the connecting the second sub-set of application scene nodes to the second process comprises connecting further application scene nodes as child nodes to elements of the first sub-set or the second sub-set of the application scene nodes, the elements representing parent nodes. In an implementation form of the method 100, the further application scene nodes comprise location and rotation difference information with respect to their parent nodes. In an implementation form of the method 100, the location and rotation difference information comprises a matrix. In an implementation form of the method 100, the location and rotation difference information comprises a 4×4 matrix. In an implementation form of the method 100, the constructing the 3D scene graph comprises computing reflections, refractions, shadowing, shading and/or overlapping of the 3D resources with respect to each other.

Figure 2:
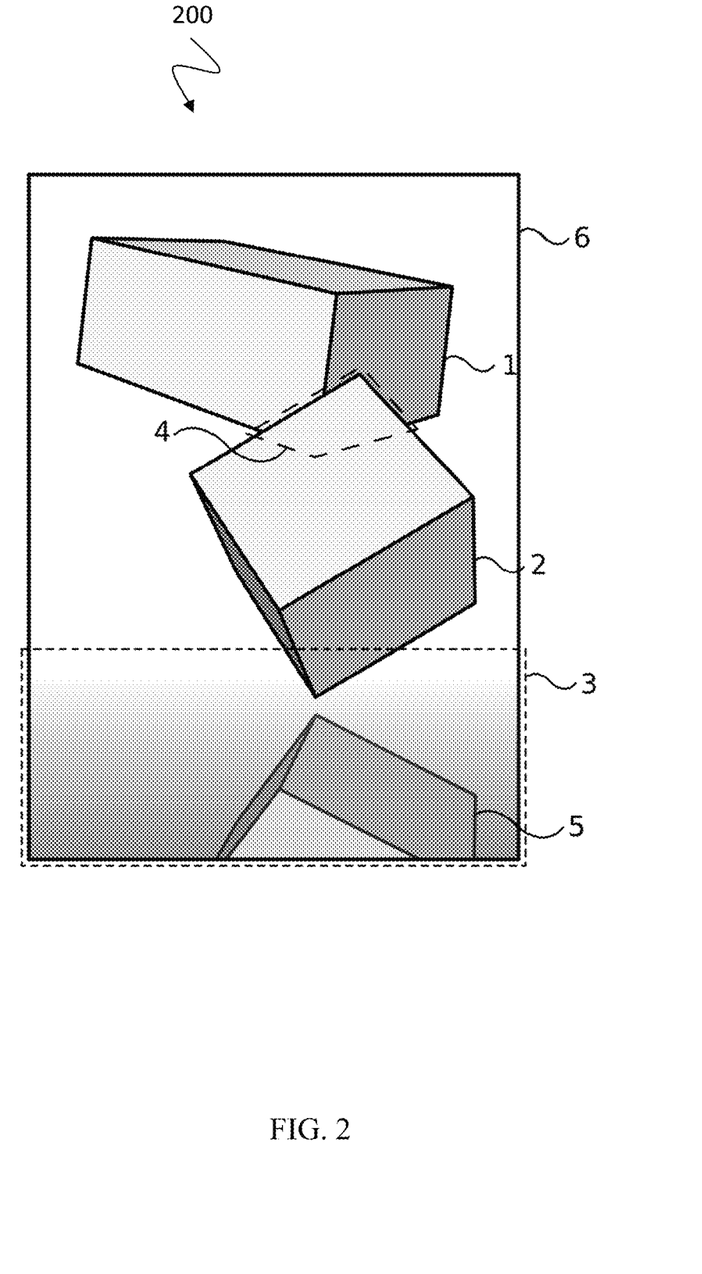
FIG. 2 shows a schematic diagram of a device screen 200 representing content of a 3D display server according to an implementation form.

FIG. 2 shows a schematic diagram of a device screen 200 representing content of a 3D display server according to an implementation form. The device screen 6 displays the 3D display server's content. Two simple 3D applications, a first one 1 and a second one 2 can be seen, both having one cube like a 3D mesh as a UI element. By applying the method 100 as described above with respect to FIG. 1, visualization of separate processes can overlap in new ways. For example, visualizations can be tied around each other.

The method 100 comprises attaching the 3D resources; i.e. the first 3D cube 1 and the second 3D cube 2. The method 100 further comprises separating the first process processing the first 3D cube 1 from the second process processing the second 3D cube 2. The method 100 further comprises loading the first process processing the first 3D cube 1 and the second process processing the second 3D cube 2 to the display server. The display server displays both cubes 1 and 2 including the reflection 5 of the second 3D application 2 on the display screen as can be seen in FIG. 2.

Construction of the display server's scene graph can be described as follows: first, a display server process has to be started to provide service for the application processes. Display server is running usually when operating system beneath it is running to make possible application process visualizations on the physical screen. While display server is running application processes can register themselves to it. Display server accepts registration of new application processes and provides them the inter-process connection. In addition, the display server has to be available for the whole life time of the application processes which use it, in order to facilitate composition of the process visualizations. This connection makes possible for the application processes to send their scene graph and changes in it to the display server. Changes can contain, for example, location, rotation, or scaling information for graphical nodes and resource identifiers. Applications can also change their internal look by changing, adding or removing data from the own internal scene graph. The changes application is doing for its own scene graph are transmitted to display server which then can composite the overall scene graph. Loading of the resources is controlled by the display server to control usage of the hardware resources, like memory, central processing unit (CPU) and graphical processing unit (GPU). Display server also provides system level changes, user interface inputs and bounding volume changes to application process.

The overlapping area 4 between the separate process visualizations can be seen in FIG. 2. Effects like shadows, shading, refractions and reflections become more natural looking because of the nature of the 3D surfaces in UI elements. FIG. 2 shows, that both of the applications have shading based on the same light source. Also, the area bottom 3 of the screen 6 is reflecting the second one 2 of the visualized 3D applications. A reflection 5 of the second 3D application 2 can be seen. The final image to be shown at physical display, like the one shown at FIG. 2, is created inside the display server process. Display server process renders the overall scene graph which is originally combined from the application process scene graphs.

Process separation interface can be implemented either inside operating system kernel level or on top-of operating system kernel level. The first option in implementation can give performance boost to the system because of the more controlled hardware management. The latter option gives more flexibility when thinking portability. Display server data structures are protected by mutexes so that parallel changes cannot corrupt the display server's scene graph data. For application process, the display server's service offers asynchronous API where application process does not need to care about locking, etc. to keep the overall scene graph valid.

Figure 3:
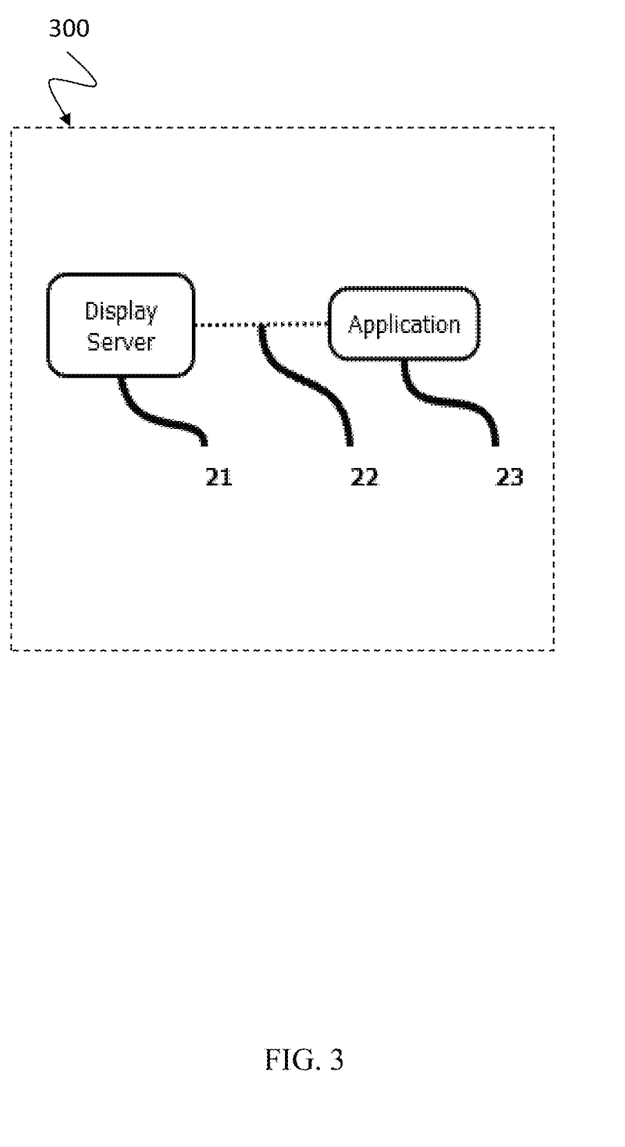
FIG. 3 shows a schematic diagram illustrating the structure of process separation 300 according to an implementation form.

FIG. 3 shows a schematic diagram illustrating the structure of process separation 300 according to an implementation form. Process separation is to the separating 103 the first process from the second process as described above with respect to FIG. 1.

FIG. 3 shows a structure from the process separation. The display server 21 comprises an application interface. By using that application interface, applications 23 can connect to the display server 21 over a process separation 22. 3D resources and the application 23 scene and data changes; i.e. handles or data itself, are transferred over the process separation 22. The display server 21 may comprise multiple application 23 connections at the same time.

Figure 4:
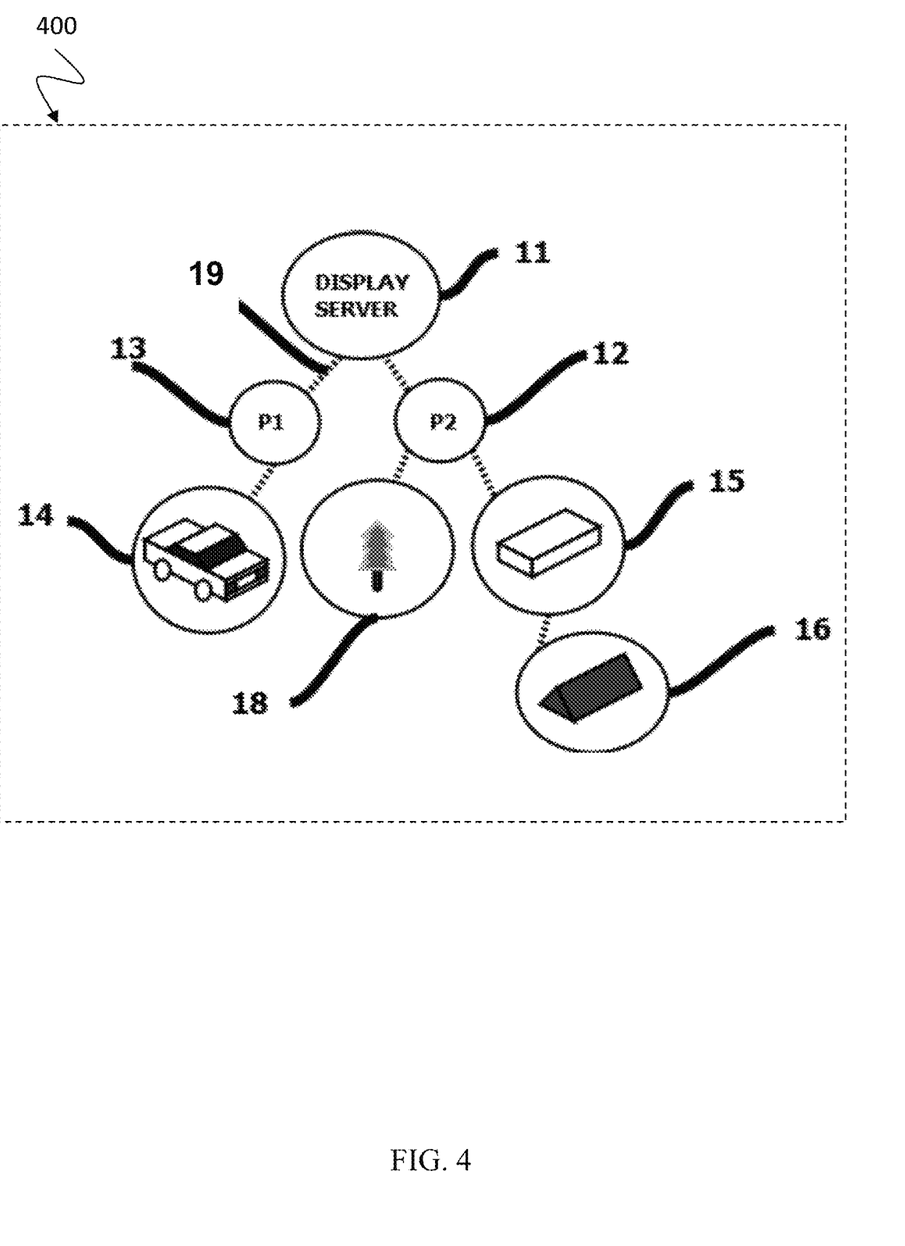
FIG. 4 shows a schematic diagram illustrating an exemplary scene graph 400 according to an implementation form.

FIG. 4 shows a schematic diagram illustrating an exemplary scene graph 400 according to an implementation form. The scene graph 400 applies process separations 12, 13 connected to the display server 11. Scene graph node connections are shown with dotted lines. The two processes P1, P2 are attached to the display server 11 by a process separation interface 19 corresponding to the process separation 22 as described with respect to FIG. 3. The display server 11 may correspond to the display server 21 described above with respect to FIG. 3.

A 3D object representing a car 14 is connected to the first process P1. A 3D object representing a tree 18 is connected to the second process P2. Another 3D object representing a house 15, 16 being composed of a basement 15 and a roof 16 is connected to the second process P2. The roof 16 is applied as a child node to the basement 15 which is the parent node connected to the process P2.

In an implementation form, the display server is embedded or functions inside an application process and other applications are linked to the display server over the process separation. Thus, a tree structure can be formed where the node chain from root to leaf in the overall scene graph can have more than one process separation.

Figure 5:
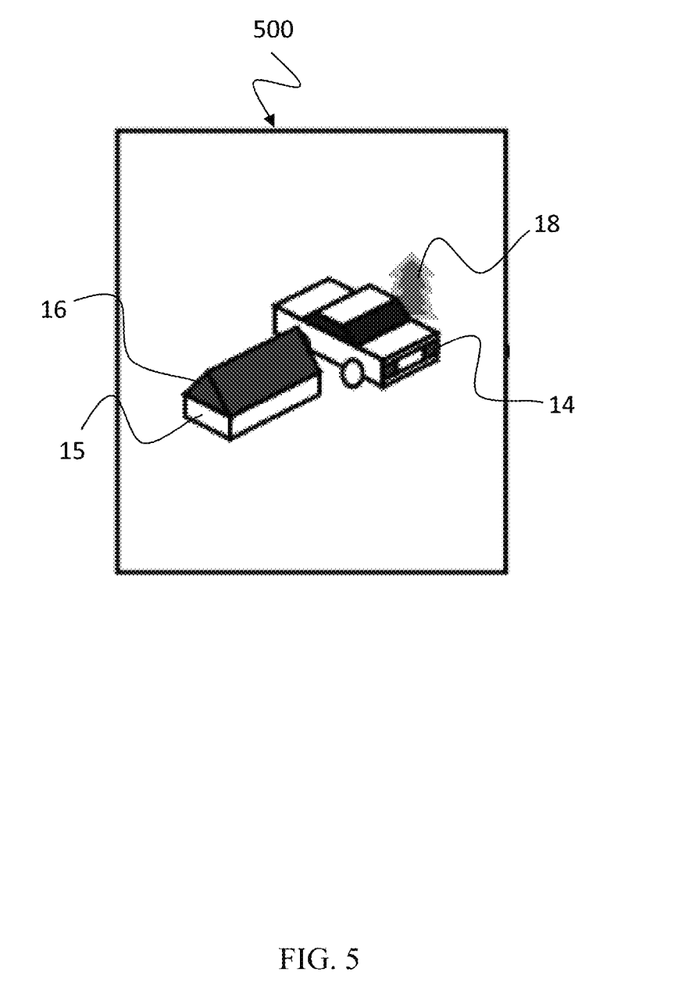
FIG. 5 shows a schematic diagram illustrating a rendering result 500 of the scene graph 400 depicted in FIG. 4 according to an implementation form.

FIG. 5 shows a schematic diagram illustrating a rendering result 500 of the scene graph 400 depicted in FIG. 4 according to an implementation form. The scene graph 400 comprises the nodes depicted in FIG. 4; i.e., the house with basement 15 and roof 16, the car 14 and the tree 18.

The process separated scene graphs depicted in FIG. 4 are combined to the render result 500. In FIG. 5, the first process P1 13 contains only one connected node which is the node representing graphically the car 14. The second process P2 12 contains two sub nodes which are the node representing graphically the tree 18 and the node representing the graphically basement 15 of the house. The process P2 12 further contains a sub-sub node which is the node representing graphically the roof 16 of the house. That is, the first process 13 represents graphically a car 14, and the second process 12 represents graphically a tree 18 and a house 15, 16. The house has an internal structure of two nodes 15, 16.

Scene nodes as depicted in FIG. 5 can have 3D resources, like texture, shader and mesh. These 3D resources can come from a 3D Widget Toolkit or they can be custom made. Each one of the scene nodes comprises location and rotation difference information related to the node's parent node, for example in form of 4×4 matrix. To restrict applications from colliding; i.e. going "inside" of each other, applications have a bounding volume, which can be as simple as a rectangular box and a sphere or some more complicated volume like a custom 3D mesh.

When 3D resources are attached to application scene nodes, they are loaded in centralized manner by the display server process. This reduces the communication over process separation because same 3D resources can be re-used between the separate processes. Only changes inside application sub graphs need to be transformed to the display server 11. This minimized data transfer enables possibility of running many complex 3D applications with process separation in same visual 3D scene.

Figure 6:
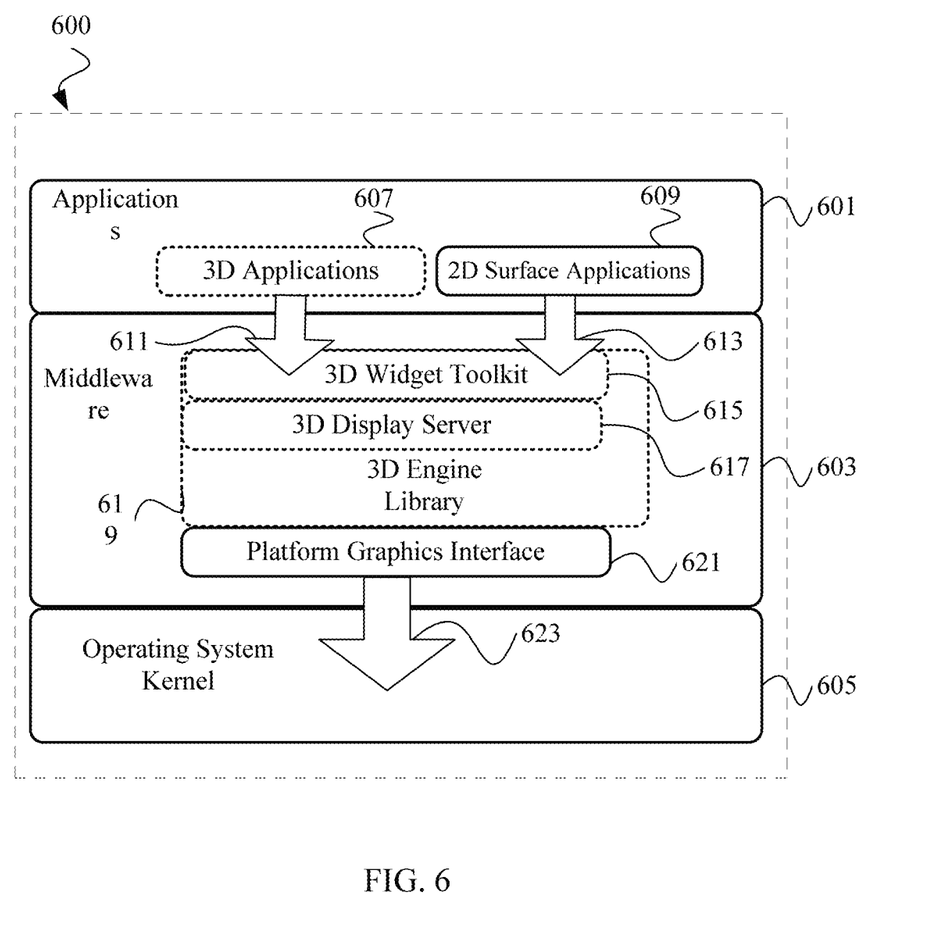
FIG. 6 shows a schematic diagram illustrating the level architecture of an operating system 600 for a 3D computer system according to an implementation form.

FIG. 6 shows a schematic diagram illustrating the level architecture of an operating system 600 for a 3D computer system according to an implementation form.

Application 601, middleware 603 and operating system kernel level 605 are separated to each of their own rows. Components that are newly built for the 3D system described herein are bordered with dotted lines. These newly designed components are the 3D Engine Library 619, the 3D Display Server 617, the 3D Widget Toolkit 615 and the 3D Applications 607. The 3D Engine Library 619 contains the 3D engine and basic core functionality. The 3D Display Server 617 enables the 3D application interface 611 replacing the existing "window manager". In an implementation form, the Platform Graphics Interface 621, 623 uses GLES/EGL. In an implementation form, the Platform Graphics Interface 621, 623 uses DirectX API. The 3d Display Server 617 comprises also the renderer that creates the end result from the applications to the physical screen. The 3D Widget Toolkit 615 provides ready-made UI components for 3D application creation. The 3D Applications 607 are new 3D Widget Toolkit based applications. 2D Surface Applications 609 are still supported by the operating system 600. In full screen mode especially the Platform Graphics Interface 621, 623 can be used more straight to gain a higher performance.

The formerly designed operating system can function as a basis of the operating system's 600 graphics stack. The new operating system 600 applies process separation inside application context, like 3rd party 3D advertisements mapped to 3D data in an augmented reality application.

From the foregoing, it will be apparent to those skilled in the art that a variety of methods, systems, computer programs on recording media, and the like, are provided.

The present disclosure also supports a computer program product including computer executable code or computer executable instructions that, when executed, causes at least one computer to execute the performing and computing steps described herein.

Many alternatives, modifications, and variations will be apparent to those skilled in the art in light of the above teachings. Of course, those skilled in the art readily recognize that there are numerous applications of the invention beyond those described herein. While the present inventions has been described with reference to one or more particular embodiments, those skilled in the art recognize that many changes may be made thereto without departing from the scope of the present invention. It is therefore to be understood that within the scope of the appended claims and their equivalents, the inventions may be practiced otherwise than as specifically described herein.

What is claimed is:

1. A method for displaying a three-dimensional (3D) scene on a screen comprising 3D resources, the method comprising:
attaching, by applications, the 3D resources to a set of nodes in a scene graph;
connecting, by the applications, a first sub-set of nodes in the scene graph to a first process and a second sub-set of nodes in the scene graph to a second process, wherein one or more 3D resources which are attached to the first sub-set of nodes correspond to a first application and one or more 3D resources which are attached to the second sub-set of nodes correspond to a second application, and wherein the first process is running in a first application context and the second process is running in a second application context; and
performing, by a 3D display server, a rendering of the scene graph based on the 3D resources obtained from the first process and the second process to display the 3D scene on the screen by computing at least one of reflections, refractions, shadowing, or shading of at least one 3D resource with respect to at least another 3D resource, wherein the 3D resources represent elementary 3D objects comprising textures, shades, or meshes, wherein the elementary 3D objects are rendered by the 3D display server, wherein the first process and the second process register with the 3D display server, wherein the first process and the second process communicate with the 3D display server using a process separation interface provided by the 3D display server, wherein the process separation interface is used by the 3D display server to separately communicate with the first process and the second process, and wherein the process separation interface provides conflict avoided accesses which are initiated by the first process and the second process accessing to a same node of the scene graph.

2. The method of claim 1, wherein the first application context is a 3D application context and the second application context is a 2D application context.

3. The method of claim 1, further comprising communicating, by the 3D display server, with multiple application connections at the same time.

4. The method of claim 1, further comprising loading to the 3D display server, by the process separation interface only, processes that have changed.

5. The method of claim 1, wherein connecting the first sub-set of nodes in the scene graph to the first process and the second sub-set of nodes in the scene graph to the second process comprises connecting, by the applications, a further node as a child node to a node of the first sub-set of nodes or the second sub-set of nodes, wherein the node of the first sub-set of nodes or the second sub-set of nodes represents a parent node of the further node.

6. The method of claim 5, wherein the further node comprises location and rotation difference information with respect to the parent node.

7. The method of claim 6, wherein the location and rotation difference information comprises a 4×4 matrix.

8. The method of claim 1, further comprising controlling, by the process separation interface, a sharing of the first sub-set of nodes and the second sub-set of nodes by the first process and the second process to ensure that no process can access 3D resources owned by other processes.

9. The method of claim 1, wherein the rendering of the scene graph by the 3D display server is the only rendering performed on the 3D resources.

10. A computer system, comprising:
a screen;
one or more processors; and
a memory coupled to the one or more processors and configured to store executable instructions that, when executed by the one or more processors, cause the computer system to:
attach, by applications of the computer system, 3D resources to a set of nodes in a scene graph;
connect, by the applications of the computer system, a first sub-set of nodes in the scene graph to a first process and connect a second sub-set of nodes in the scene graph to a second process, wherein one or more 3D resources which are attached to the first sub-set of nodes correspond to a first application and one or more 3D resources which are attached to the second sub-set of nodes correspond to a second application, and wherein the first process is running in an first application context and the second process is running in a second application context; and
perform, by a 3D display server, a rendering of the scene graph based on the 3D resources obtained from the first process and the second process to display a 3D scene on the screen by computing at least one of reflections, refractions, shadowing, or shading of at least one 3D resource with respect to at least another 3D resource, wherein the 3D resources represent elementary 3D objects comprising textures, shades, or meshes, wherein the elementary 3D objects are rendered by the 3D display server, wherein the first process and the second process register with the 3D display server, wherein the first process and the second process communicate with the 3D display server using a process separation interface provided by the 3D display server, wherein the process separation interface is used by the 3D display server to separately communicate with the first process and the second process, and wherein the process separation interface provides conflict avoided accesses which are initiated by the first process and the second process accessing to a same node of the scene graph.

11. The computer system of claim 10, wherein the one or more processors further cause the computer system to load to the 3D display server, by the process separation interface only, processes that have changed.

12. The computer system of claim 10, wherein the one or more processors further cause the computer system to separately enable communications, by the process separation interface, between each of the first process and the second process and the 3D display server at the same time.

13. The computer system of claim 10, wherein the one or more processors further cause the computer system to connect, by the applications, a further node as a child node to a node of the first sub-set of nodes or the second sub-set of nodes, wherein the node of the first sub-set of nodes or the second sub-set of nodes represents a parent node of the further node and the further node comprises location and rotation difference information with respect to the parent node of the further node.

14. The computer system of claim 10, wherein the one or more processors further cause the computer system to control, by the process separation interface, a sharing of the first sub-set of nodes and the second sub-set of nodes by the first process and the second process to ensure that no process can access 3D resources owned by other processes.

15. A computer program product, comprising computer executable instructions stored on a non-transitory computer readable medium such that, when executed by one or more processors, the computer executable instructions cause a computer system to:
attach 3D resources to a set of nodes in a scene graph;
connect a first sub-set of nodes in the scene graph to a first process and a second sub-set of nodes in the scene graph to a second process, wherein one or more 3D resources which are attached to the first sub-set of nodes correspond to a first application and one or more 3D resources which are attached to the second sub-set of nodes correspond to a second application, and wherein the first process runs in a first application context and the second process runs in a second application context; and
perform, by a 3D display server, a rendering of the scene graph based on the 3D resources obtained from the first process and the second process to display a 3D scene by computing at least one of reflections, refractions, shadowing, or shading of at least one 3D resource with respect to at least another 3D resource, wherein the 3D resources represent elementary 3D objects comprising textures, shades, or meshes, wherein the elementary 3D objects are rendered by the 3D display server, wherein the first process and the second process register with the 3D display server, wherein the first process and the second process communicate with the 3D display server using a process separation interface provided by the 3D display server, wherein the process separation interface is used by the 3D display server to separately communicate with the first process and the second process, and wherein the process separation interface provides conflict avoided accesses which are initiated by the first process and the second process accessing to a same node of the scene graph.

16. The computer program product of claim 15, wherein only the 3D display server performs the rendering of the scene graph.

17. The computer program product of claim 15, wherein the computer executable instructions further cause the computer system to load to the 3D display server, by the process separation interface only, processes that have changed.

18. The computer program product of claim 15, wherein the computer executable instructions further cause the computer system to control, by the process separation interface, a sharing of the first sub-set of nodes and the second sub-set of nodes by the first process and the second process to ensure that no process can access 3D resources owned by other processes.

* * * * *